Figure 4:
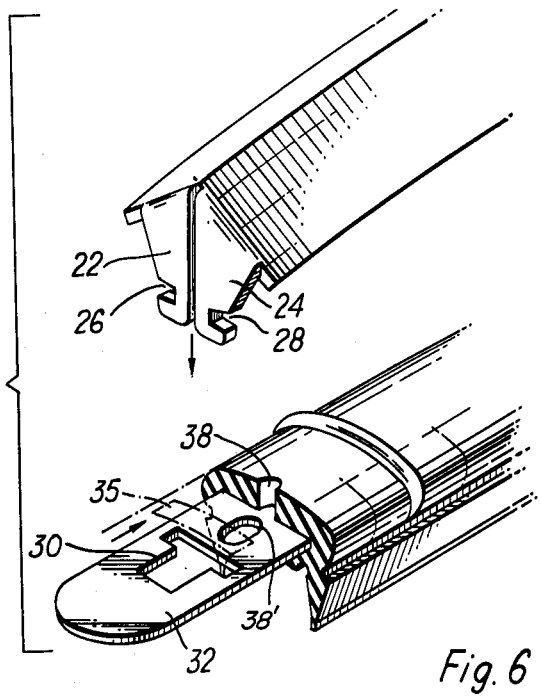

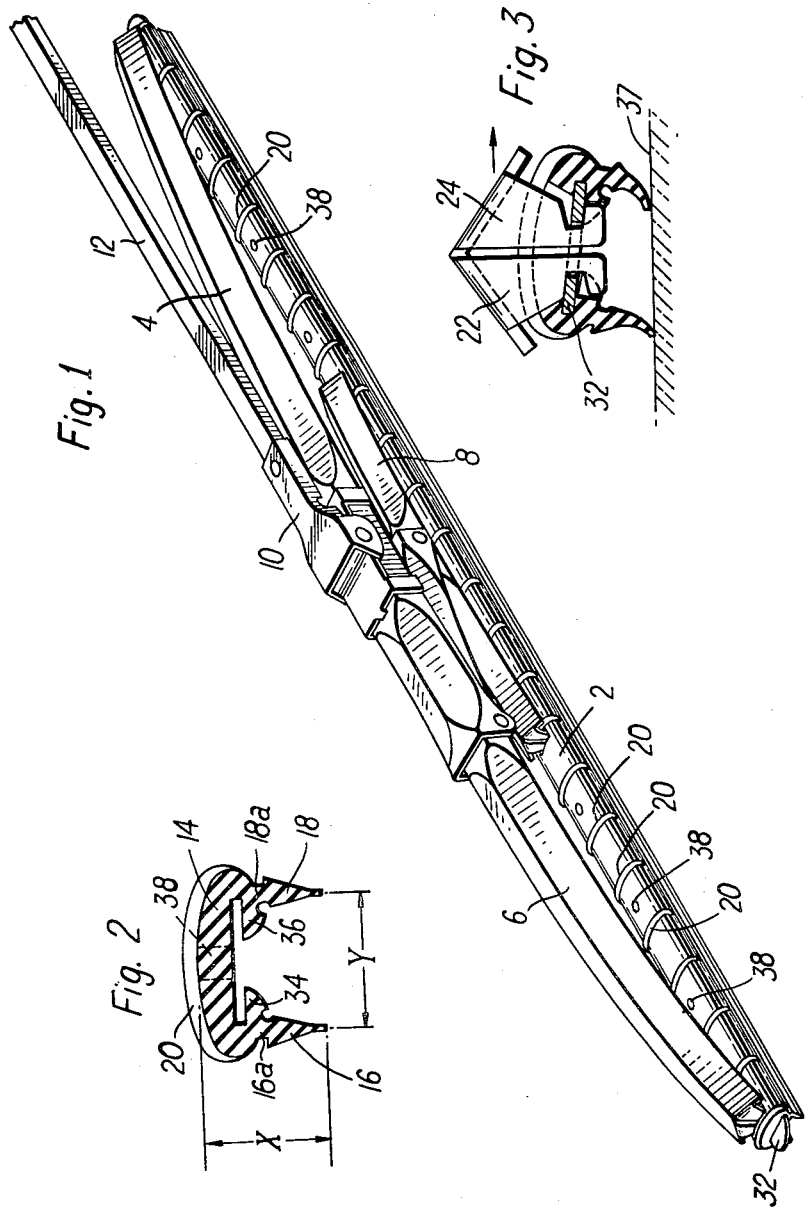

Oct. 9, 1962  P. G. K. SMITHERS  3,056,991
WINDSCREEN WIPERS
Filed April 29, 1959  2 Sheets-Sheet 2

Inventor
PHILLIP GEOFFREY KENT SMITHERS
By
Beau, Brooks, Buckley & Beau.
Attorneys

United States Patent Office 3,056,991
Patented Oct. 9, 1962

3,056,991
WINDSCREEN WIPERS
Phillip Geoffrey Kent Smithers, Ealing, England, assignor to Trico Products Corporation, Buffalo, N.Y., a corporation of New York
Filed Apr. 29, 1959, Ser. No. 809,839
12 Claims. (Cl. 15—250.41)

This invention is concerned with the blades of windscreen wipers, which are commonly made of rubber (and will in this specification be termed "rubbers") and have a single wiping edge. The rubber of a wiper is commonly supported by a vertebra (which will in this specification be termed a "backing strip") which provides stiffness in a plane parallel to the windscreen and permits longitudinal flexing in a perpendicular plane. The backing strip is attached to a harness which is carried by an arm on an oscillating shaft.

According to the present invention a rubber is formed with two wiping lips extending in substantially the same direction from a body and separated by substantially the width of the rubber. This enables a rubber to be made shallower than has hitherto been possible, that is to say that it has a smaller projected area in the path of wind flowing parallel to the surface of the screen. In fact, the height of the rubber is according to this invention made as small as is possible without sacrificing the efficiency of the wiping lips and the effectiveness of the body in being secured to the harness. Rubbers according to the present invention are less prone than other rubbers to be lifted off the windscreen by wind when the vehicle is travelling at high speed.

The height of a rubber for use on motor cars is preferably less than 0.55 inch.

The width of a rubber according to the present invention is determined by practical considerations. These are that the body of the rubber must be wide enough to carry a backing strip which is sufficiently stiff in a plane parallel to the windscreen, and yet not so wide that it obscures the view through the windscreen unnecessarily.

The United States Patent No. 2,289,545 shows a rubber having a body and two parallel lips, but this rubber has the wrong proportions to have the effect provided by rubbers according to the present invention. Owing to the nature of this invention it is, however, not possible to define precisely what proportions a rubber must have to be effective, and the most satisfactory definition distinguishing from the above noted patent is accordingly somewhat empirical. According to such a definition the ratio of total height to distance between the lips is less than 2 to 1 and is preferably less than 1.25 to 1.

Preferably the wiping lips are integral with the body of the rubber, and the backing strip is in the form of a flat strip and lies in a slot in the body of the rubber, the edges of the backing strip being gripped by flanges on the rubber. The backing strip is preferably attached to the harness by outwardly directed claws in the form of fingers which extend through one or more openings in the strip and have notches in their side edges in which the strip engages. These notches may be widened towards the outside or be otherwise shaped to permit slight layover of the rubber in both directions of movement of the wiper. For example, the layover may be 15° to each side of the position in which the wiping lips are at right angles to the windscreen when unstressed.

As an alternative to outwardly directed claws the harness may have inwardly directed claws which embrace the edges of a backing strip for the rubber.

Preferably there are, at intervals along the rubber, holes which extend from between the wiping lips to the back of the rubber. This prevents a rise of air pressure in the space under the rubber between the wiping lips tending to lift the rubber off the windscreen.

In accordance with the invention, the rubber may be formed with ribs at intervals across the back and part of the way down the sides.

The wiping lips must be made basically substantially symmetrical about central planes in order to be capable of wiping in both directions of movement.

Figure 5:
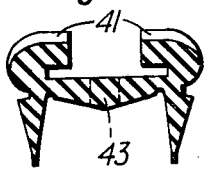
Figure 6:
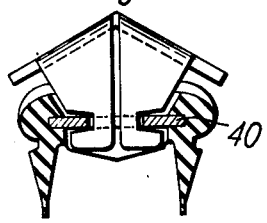
Figure 7:
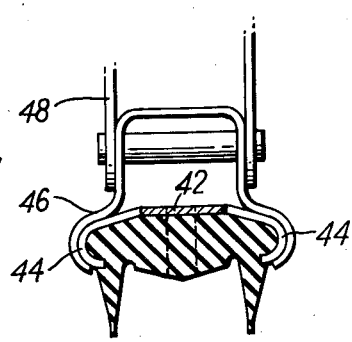

Three examples of rubbers according to the present invention are shown in the accompanying drawing. In these drawings:

FIGURE 1 is a perspective view of one rubber attached to a harness;
FIGURE 2 is a cross-section of the rubber;
FIGURE 3 is a cross-section showing how the rubber is attached to the harness (shown diagrammatically) and the attitude which the rubber takes up when wiping;
FIGURE 4 is an exploded view of one end of the rubber and harness showing how the wiper is assembled;
FIGURE 5 is a cross-section of a modified rubber;
FIGURE 6 is a cross-section of the modified rubber showing how the rubber is attached to a harness (shown diagrammatically); and
FIGURE 7 shows a cross-section of a second modified rubber.

FIGURE 1 shows a rubber 2 attached at four points to a harness consisting of a primary yoke 4, a secondary yoke 6 and a tertiary yoke 8, all pivoted together. A clip 10 is pivotally attached to the primary yoke and receives the end of a wiper arm 12 which is partly shown.

The rubber 2 consists of a body 14 and integral parallel wiping lips 16 and 18 which are joined to the body by thin necks 16a and 18a. The back of the rubber is convex away from the windscreen, as shown in FIGURE 2, and the rubber is formed at intervals with ribs 20 which extend across the back and part of the way down the sides. FIGURE 2 is a cross-section of the rubber between these ribs.

FIGURES 3 and 4 show how the rubber is attached to the two ends of the tertiary yoke and the outer ends of the primary and secondary yokes, and how the assembly is carried out. At each point of attachment the harness has two claws in the form of fingers 22 and 24 which project from the end of a yoke and have notches 26 and 28 in their side edges (see particularly FIGURE 4). Each pair of fingers extends through a T-shaped opening 30 in a backing strip which is in the form of a flat metal strip 32. The backing strip lies in a slot between the two wiping lips and its edges are gripped by ribs or flanges 34 and 36 on the rubber.

During assembly of the wiper the backing strip is inserted into the end of the slot and is moved to a position in which the cross-part of each T-shaped opening is in alignment with a narrow opening 35 (see FIGURE 4) in the body of the rubber. The claws on the harness are then inserted through the openings in the rubber and backing strip, and the backing strip is moved in the direction shown by the arrow in FIGURE 4 until the claws are at the narrow ends of the T-shaped openings. In this final position the backing strip may be located by pips or their equivalent. The claws are thinner than the openings in the rubber, to permit relative longitudinal movement between the claws and the rubber when the rubber bends to wipe a curved part of a windscreen.

FIGURE 3 shows the amount of layover which the means of attaching the rubber to the harness permits during wiping. The rubber is in the attitude which it takes up when wiping from the left to the right in FIGURE 3 and is shown wiping a surface 37.

At intervals along the rubber there are holes 38 which extend from between the wiping lips to the back surface of the rubber to prevent pressure building up underneath the rubber. These holes will extend through the flexible backing strip 32, as indicated at 38' in FIG. 4. In the embodiment of FIG. 5 the backing strip will overlie the transverse body part and thus constitute the back of the rubber.

The height of the rubber when unstressed is the dimension X in FIGURE 2 and is equal to 0.21 inch. The distance between the lips is the dimension Y in FIGURE 2, which is slightly greater than X, so that the ratio of X to Y is slightly less than 1 to 1.

FIGURE 6 shows a rubber having a backing strip 40 which is in the form of a flat strip lying in a slot in the back of the rubber. The height of this rubber when unstressed is 0.24 inch. FIGURE 5 is a cross-section between ribs or flanges 41 which are formed at intervals along the rubber. There are at intervals along the rubber a number of holes 43 which prevent pressure building up underneath the rubber during wiping.

From the foregoing, it will be observed that the elongate rubber has a transverse body part which integrally joints spaced apart side portions, each side portion carrying a wiping lip and a strip-gripping flange. The two flanges oppose each other and form a strip-receiving slot that is open along one side. In FIG. 2 the slot opens downwardly from the body part and between the substantially parallel wiping lips, whereas in FIG. 5 the slot opens upwardly from the body part and between the lip planes. In both embodiments, each side portion includes a wiping lip and a strip supporting and gripping flange. The transverse body part has its medial portion thickened for reinforcement, with the pressure reducing holes 38 and 43 extending through the body part.

FIGURE 7 shows a rubber with an external backing strip 42 which lies along the back of the rubber and has claws 44 gripping the rubber at intervals along the rubber. The backing strip is loosely embraced by a saddle 46 which is pivoted to a harness 48, partly shown.

All three rubbers shown in the accompanying drawings are made by first moulding a rubber with excessively deep lips and then trimming the edges of the lips. The rubbers are shown in the drawings as trimmed and ready for use.

I claim:

1. A windscreen wiper rubber comprising an elongate body having a transversely extending body part supporting laterally spaced side portions, said side portions forming laterally spaced and laterally flexible wiping lips depending from the opposite side margins of said transverse body part, each side portion being provided on its inner face with a strip-supporting and gripping flange, said flanges cooperating with said transverse body part to form a longitudinally extending opensided slot between said side portions for receiving a flexible surface-conforming backing strip, whereby an arm-applied pressure will be transmitted from the side margins of such strip through the respective side portions and the underlying wiping lip.

2. A windscreen wiper rubber according to claim 1, wherein the transversely extending body part is increased in thickness along its longitudinal center to act as a sustaining spacer for the laterally spaced wiping lips and supporting flanges.

3. A windscreen wiper rubber according to claim 1, wherein the transversely extending body part is formed with holes extending from between the wiping lips to the back of the rubber.

4. A windscreen wiper rubber according to claim 1, wherein the side portions are reduced in thickness adjacent the body part and beneath the strip-gripping flanges to provide hinged support for the wiping lips.

5. A windscreen wiper rubber according to claim 1, in combination with such flexible surface-conforming backing strip held in supporting contact with the transversely extending body part by said flanges.

6. A windscreen wiper rubber according to claim 5, combined with such flexible surface conforming backing strip to make a wiper blade assembly, wherein said rubber and backing strip are formed at spaced longitudinal intervals with holes extending from between the wiping lips to the back of the assembly to prevent pressure build-up underneath the rubber.

7. A windscreen wiper blade assembly comprising a harness including a plurality of elongated pressure-distributing channel members pivoted together, a flexible backing strip connected to the harness and flexible towards and from a windscreen when in use but relatively stiff sidewise, and a flexible rubber carried by said backing strip and having a body with two laterally spaced wiping lips extending from the body in substantially the same direction adjacent to the opposite lateral extremities of the said body, said pressure-distributing members of the harness having transverse walls crosswise of their channels with upright margins notched to form claws for engaging the edges of slots formed in the backing strip, said rubber being formed with a longitudinal slot in which the backing strip lies crosswise of the wiping lips, and said rubber having longitudinal flanges gripping the side margins of the backing strip.

8. A windscreen wiper blade assembly comprising a harness including pressure-distributing yoke means having terminal claw means downturned and shaped with lateral notches, a flexible backing strip supported by said yoke means and formed in one end portion with a T-opening, and a flexible wiping rubber carried by the said backing strip and formed in its back with a transverse opening that is registrable with the transverse portion of the T-opening to enable the insertion of the claw means and the interlock of the notches with the longitudinal portion of the T-opening, said rubber being movable on the strip to displace the transverse opening for securing the blade assembly interlock.

9. A windscreen wiper blade assembly according to claim 8, wherein said terminal claw means are in the form of plural independent fingers lying coplanar transversely and formed in their remote margins with said notches opening away from each other.

10. A windscreen wiper blade assembly comprising a harness including a plurality of pressure-distributing members pivoted together, a flexible backing strip connected to the said harness and being capable of flexing in a direction towards and away from a windscreen when in use but being relatively stiff in a perpendicular lateral direction, and a flexible rubber carried by the said backing strip and having an elongate body formed with two laterally spaced wiping lips extending therefrom in substantially the same direction adjacent to the opposite lateral extremities of the said body, said rubber and backing strip being formed at spaced longitudinal intervals with apertures extending from between the wiping lips to the back of the rubber whereby the space between the said wiping lips will be partially evacuated by a venturi action caused by air flow over the back of the rubber during wiping.

11. A windscreen wiper rubber according to claim 1, wherein a backing strip in the form of a flat strip lies in a slot in the body of the rubber, the edges of the backing strip being gripped by flanges on the rubber between parallel planes including the two wiping lips.

12. A windscreen wiper blade assembly comprising a flexible backing strip being capable of flexing in a direction towards and away from a windscreen when in use but being relatively stiff in a perpendicular lateral direction, and a flexible rubber carried by the said backing strip and having an elongate body formed with two laterally spaced wiping lips extending therefrom in substantially the same direction adjacent to the opposite lateral extremities of the said body, said rubber and backing strip being formed at spaced longitudinal intervals with apertures extending from between the wiping lips to the back of the rubber whereby the space between the said wiping lips will be partially evacuated by a venturi action caused by air flow over the back of the rubber during wiping.

References Cited in the file of this patent

UNITED STATES PATENTS

| | | |
|---|---|---|
| 2,664,583 | Oishei | Jan. 5, 1954 |
| 2,702,397 | Oishei | Feb. 22, 1955 |
| 2,865,040 | Hamm | Dec. 23, 1958 |
| 2,920,335 | Ryck | Jan. 12, 1960 |

FOREIGN PATENTS

| | | |
|---|---|---|
| 587,828 | France | Jan. 23, 1925 |

UNITED STATES PATENT OFFICE
CERTIFICATE OF CORRECTION

Patent No. 3,056,991                                 October 9, 1962

Phillip Geoffrey Kent Smithers

It is hereby certified that error appears in the above numbered patent requiring correction and that the said Letters Patent should read as corrected below.

Column 1, line 34, for "0.55" read -- 0.35 --.

Signed and sealed this 19th day of February 1963.

(SEAL)
Attest:

ESTON G. JOHNSON
Attesting Officer

DAVID L. LADD
Commissioner of Patents